(12) United States Patent
Keyser et al.

(10) Patent No.: US 9,142,829 B2
(45) Date of Patent: Sep. 22, 2015

(54) PASSIVE SAFETY DEVICE AND INTERNAL SHORT TESTED METHOD FOR ENERGY STORAGE CELLS AND SYSTEMS

(75) Inventors: Matthew Keyser, Arvada, CO (US); Eric Darcy, League City, TX (US); Dirk Long, Golden, CO (US); Ahmad Pesaran, Boulder, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 324 days.

(21) Appl. No.: 13/882,316

(22) PCT Filed: Oct. 27, 2010

(86) PCT No.: PCT/US2010/054301
§ 371 (c)(1),
(2), (4) Date: Apr. 29, 2013

(87) PCT Pub. No.: WO2012/057752
PCT Pub. Date: May 3, 2012

(65) Prior Publication Data
US 2013/0209841 A1    Aug. 15, 2013

(51) Int. Cl.
*H01M 2/34* (2006.01)
*H01M 10/42* (2006.01)
*H01M 10/48* (2006.01)

(52) U.S. Cl.
CPC .......... *H01M 2/348* (2013.01); *H01M 10/4235* (2013.01); *H01M 10/4285* (2013.01); *H01M 10/48* (2013.01); *H01M 2200/00* (2013.01); *H01M 2200/10* (2013.01); *H01M 2200/103* (2013.01)

(58) Field of Classification Search
None
See application file for complete search history.

(56) References Cited

U.S. PATENT DOCUMENTS

| 5,500,503 A | 3/1996 | Pernicka et al. |
| 6,858,811 B2 | 2/2005 | Fitzgerald et al. |
| 6,891,353 B2 | 5/2005 | Tsukamoto et al. |

OTHER PUBLICATIONS

International Search Report and Written Opinion for International (PCT) Application No. PCT/US10/54301, mailed Jan. 6, 2011, pp. 1-8.
International Preliminary Report on Patentability for International (PCT) Application No. PCT/US10/54301, Issued Apr. 30, 2013, pp. 1-6.

*Primary Examiner* — Carlos Barcena
*Assistant Examiner* — Wojciech Haske
(74) *Attorney, Agent, or Firm* — John C. Stolpa (57) ABSTRACT

A passive safety device for an energy storage cell for positioning between two electrically conductive layers of the energy storage cell. The safety device also comprising a separator and a non-conductive layer. A first electrically conductive material is provided on the non-conductive layer. A first opening is formed through the separator between the first electrically conductive material and one of the electrically conductive layers of the energy storage device. A second electrically conductive material is provided adjacent the first electrically conductive material on the non-conductive layer, wherein a space is formed on the non-conductive layer between the first and second electrically conductive materials. A second opening is formed through the non-conductive layer between the second electrically conductive material and another of the electrically conductive layers of the energy storage device. The first and second electrically conductive materials combine and exit at least partially through the first and second openings to connect the two electrically conductive layers of the energy storage device at a predetermined temperature.

17 Claims, 10 Drawing Sheets

PASSIVE SAFETY DEVICE AND INTERNAL SHORT TESTED METHOD FOR ENERGY STORAGE CELLS AND SYSTEMS

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

TECHNICAL FIELD

The described subject matter relates to a passive safety device and a safety test method for energy storage devices.

BACKGROUND

Energy storage cells (also referred to herein as "cells" or "batteries") sold for consumer use in portable electronic devices and other applications have occasional failure in the field. These cells have typically passed a wide variety of safety tests, such as those required by governmental shipping regulations and by other certification organizations, but fail after the cells have been in use over time (e.g., several months), even though there have been no other reported problems with the cells that fail. Regardless, these failures can result in the cells overheating, and in some cases, going into thermal runaway wherein the cell can ignite and burn. For example, these incidents have been reported in the media as "the burning laptop" and have resulted in the recall of millions of batteries. At least some of these failures have been attributed to a latent defect introduced during the cell manufacturing process that escapes detection during initial acceptance testing and results in an internal short circuit between the positive and negative components of a cell (electrodes or current collectors) after having been in use for some time.

Safety measures such as additives, new materials, and new designs are incorporated into the cell to address these internal short circuit failures. Some test approaches/methods have been proposed to simulate an internal short to evaluate the modified design and material features. Previous approaches/methods have included (nail or rod) penetration and crush tests. For example, the military uses a nail or bullet to penetrate the battery at a specifically designed test facility; National Aeronautics and Space Administration (NASA) uses a crush test implementing a rounded rod that is pressed into the battery at the test facility; United States Advanced Battery Consortium (USABC) test procedure includes nail or rounded rod penetration; Underwriters Laboratory (UL) uses a blunt nail crush test, and some battery manufacturers use a pinch test. Other approaches have included retrofitting a metallic particle into the "jelly roll" of a battery during manufacture, which triggers a failure upon compressing, repeated charging/discharging, sonication, thermal ramping, or overcharging/over discharging at a test facility. Still other approaches include assembling a micro-heater in the cell between the anode and separator or cathode and separator and heating the separator to its melting point at a test facility. These test methods are not representative of field failures, and cannot be readily used as a safety device for batteries.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

A passive safety device (also referred to herein as "switch") is disclosed for an energy storage cell for positioning between two electrically conductive layers of the energy storage cell. The device comprises a separator and a non-conductive layer. A first electrically conductive material is provided on the non-conductive layer. A first opening is formed through the separator between the first electrically conductive material and one of the electrically conductive layers of the energy storage cell. A second electrically conductive material is provided adjacent the first electrically conductive material on the non-conductive layer, wherein a space is formed on the non-conductive layer between the first and second electrically conductive materials. A second opening is formed through the non-conductive layer between the second electrically conductive material and another of the electrically conductive layers of the energy storage cell. The first and second electrically conductive materials combine and exit at least partially through the first and second openings to connect the two electrically conductive layers of the energy storage cell at a predetermined temperature.

A method of generating an electrical short between two electrically conductive layers of the energy storage cell is also disclosed. An exemplary method comprises: providing a first electrically conductive material on a non-conductive layer; forming a first opening through a separator between the first electrically conductive material and one of the electrically conductive layers of the energy storage cell; providing a second electrically conductive material adjacent the first electrically conductive material on the non-conductive layer, wherein a space is formed on the non-conductive layer between the first and second electrically conductive materials; forming a second opening through the non-conductive layer between the second electrically conductive material and another of the electrically conductive layers of the energy storage cell; and combining the first and second electrically conductive materials to exit at least partially through the first and second openings to connect the two electrically conductive layers of the energy storage cell at a predetermined temperature.

In addition to the exemplary aspects and embodiments described above, further aspects and embodiments will become apparent by reference to the drawings and by study of the following descriptions.

The device or switch is used in a test method to simulate latent flaws for triggering internal short circuit in energy storage cells. In this test method, the device is implanted in a cell in a specific and user-defined location between specific and user-defined internal layers of the cell. The cell is formed, or charged and discharged, or aged according to user-defined specifications. Then the device is activated by the appropriate stimulus such as heating, sonication, radiation, etc. in a test facility. After activation, the device creates a conductive path between the positive and negative layers of the cell. The response of the cell will be measured as the results of this internal short circuit.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

Battery manufacturers have found it difficult to study battery failure, which rarely occurs after the cell has passed initial acceptance tests, yet have catastrophic consequences while in use in the field. Safety measures are being proposed to be incorporated in various cell design to address the internal short circuit field failures. In addition mathematical simulations are being developed to understand the behavior of the cells due to internal short circuit. Therefore, to evaluate the proposed safety measures and also validate mathematical simulations of this failure, we need a reliable method to induce a cell internal short on demand in the laboratory with conditions and results that are relevant to catastrophic field failures. In addition, there is a need to provide a safety device in order to reduce or altogether prevent and/or mitigate the effects of such a failure.

Briefly, embodiments are disclosed herein which include a switch inside the battery itself; which is activated by an increase in temperature or other external mechanisms such as sonication or radiation. Exemplary embodiments may be utilized with spirally-wound and stacked flat-plate cells containing any of the common lithium-ion, lithium sulfur, or lithium air electrochemical components. The switch may be placed anywhere within the battery and may be used, for example, with both spirally wound and flat-plate cells in either cylindrical or prismatic configurations. The switch activates automatically when a predetermined temperature or condition is reached.

In exemplary embodiments, the switch includes a material which melts at a predetermined temperature (or range of temperatures) and causes the positive and negative components (electrodes, current collectors, and or foils) of the battery to be electrically connected. The switch may also include an electrically conductive material or combination of materials. The perimeter of the switch may be attached to the battery separator material by thermal/chemical bonding (e.g., "glued" or otherwise attached) or mechanical bonding.

Exemplary positioning of the switch includes but is not limited to: 1) between the cathode and anode, 2) between the cathode and the negative electrode, 3) between the anode and the positive electrode, and 4) between the positive and negative electrodes. Each of these configurations represents different types of internal shorts. Placement of the switch on different areas of the separator enables different shorting mechanisms. Upon activation of the switch, the cathode and anode of the battery are electrically connected which results in an internal short.

Accordingly, the battery can be operated (including cycled through charges) as it normally would as long as the temperature does not meet or exceed the activation temperature of the switch. When the switch activates either due to an artificial or "test-facility-generated" increase in temperature (and other stress factors) or an actual increase in temperature during use), the cathode and anode of the battery are electrically connected to produce an internal short in the battery. Accordingly, the switch may be used at test facilities to produce an on-demand failure. In addition, the switch has application in batteries that are distributed for normal use as a passive safety device which activates automatically when a predetermined temperature (or condition) is reached, and shorts the battery, and safely dissipates its energy, before it gets hot enough to ignite and cause a fire.

Before continuing in detail, it is noted that the switch may be positioned anywhere within the battery and may be used with both spirally wound and flat-plate cells. The switch placed in the battery only activates if a predetermined temperature or condition is achieved. Therefore, the battery can be used and cycled as long as the switch temperature does not exceed the switch's activation temperature. Once the switch is activated, the cathode and anode of the battery are electrically connected and an internal short results.

Figure 1:
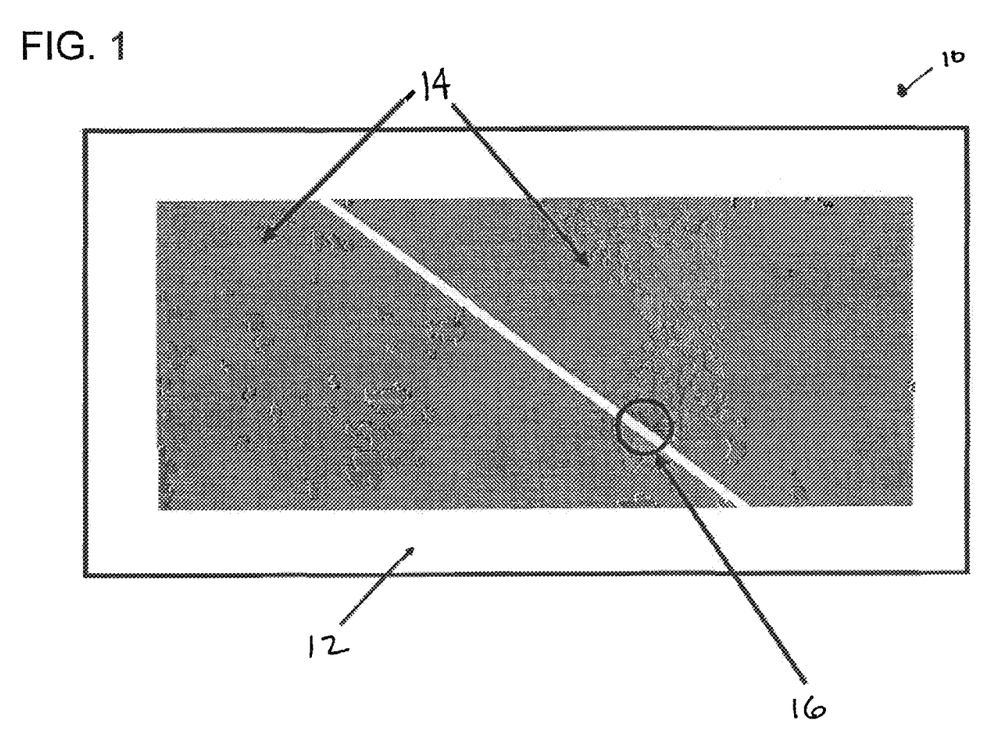
FIG. 1 shows the device or switch as it may be positioned within an electrochemical cell.

FIG. 1 shows the switch 10 as it may be positioned within an electrochemical cell. The switch includes a non-conductive material 12, such as a piece of separator material already used within the battery. The length and width may be as short as about 0.010 inches or as long as several inches. An electrically conductive material 14 is placed on the separator material. A partial list of how an electrically conductive material 14 can be deposited are through chemical vapor deposition, plasma enhanced chemical vapor deposition, physical vapor deposition, thermal evaporator, electron beam evaporator, sputtering, and plating. A sheet of electrically conductive material 14 can also be cut to the desired shape and placed, melted, or glued onto the non conductive material. The electrically conductive material 14 may have a melting point between about 10° C. and 150° C. and have a thickness of less than 500 microns. The switch 10 includes at least two portions of electrically conductive material that are separated by a small space 16, sized between about 0.0005 and 0.25 inches.

Figure 2:
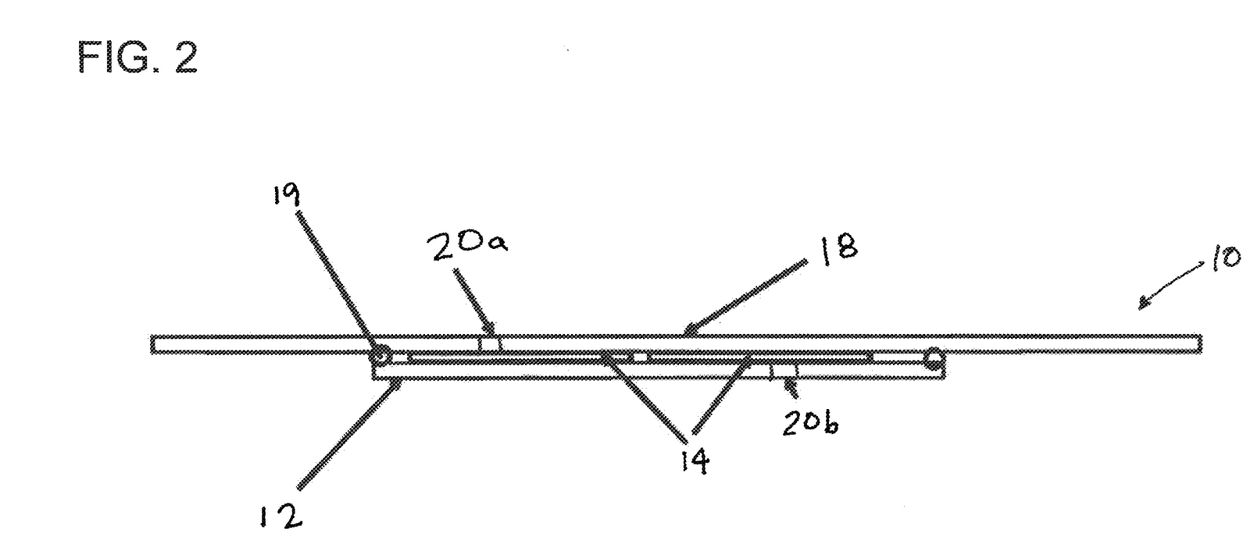
FIG. 2 shows how the switch may be placed in a battery.

FIG. 2 shows how the switch 10 may be placed in a battery. The perimeter of the switch 10 is attached to the battery separator material 18 through thermal bonding 19 or is "glued" to the separator material 18. Most separator materials 18 are poor wicks when it comes to liquefied metal. Therefore, a small hole or slit 20a may be formed through the battery separator material 18 adjacent one of the electrically conductive areas, and a second small hole or slit 20b may be formed through the non-conductive material 12 adjacent the second electrically conductive area.

The size of the hole or slit 20a-b defines how much current flows through the internal short once the short is activated. For example, if the hole or slit 20a-b is large, then a hard short will exist in the battery. If the hole or slit 20a-b is small, then a "soft" short will exist within the battery. Furthermore, the amount of current drawn through the switch 10 can be adjusted by adjusting the distance between the two holes 20a-b and the cross sectional area of the electrically conductive material 14.

Figure 3:
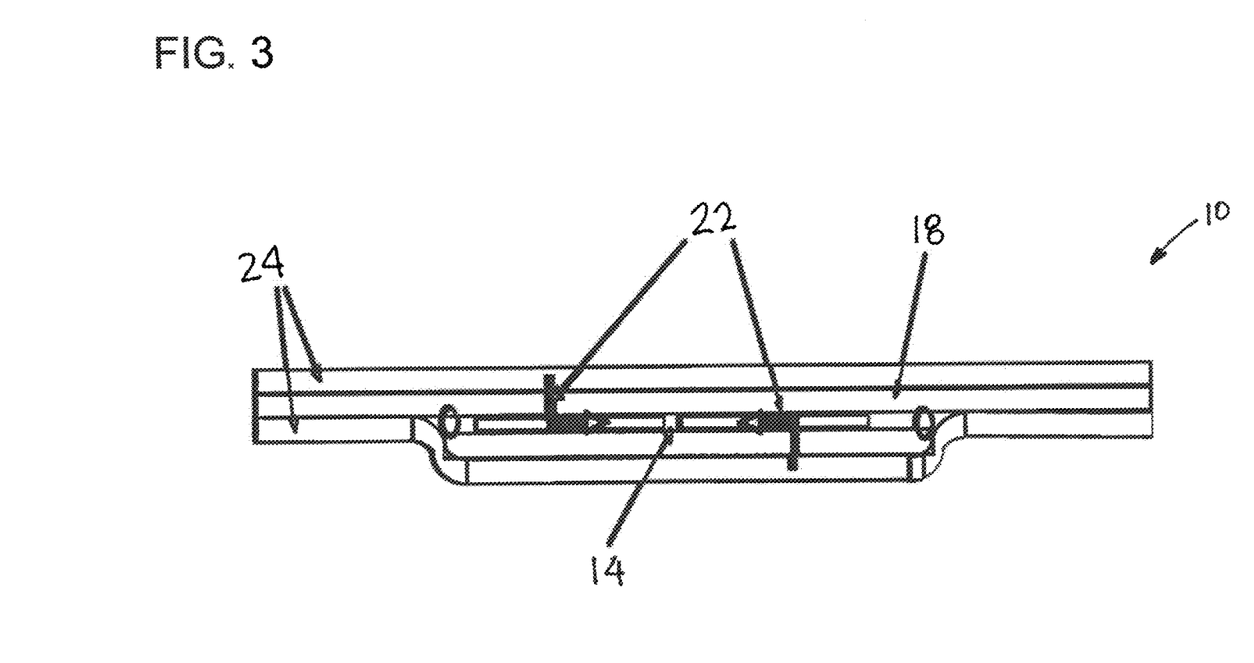
FIG. 3 shows how current is shunted through the switch from the cathode to the anode.
Figure 4:
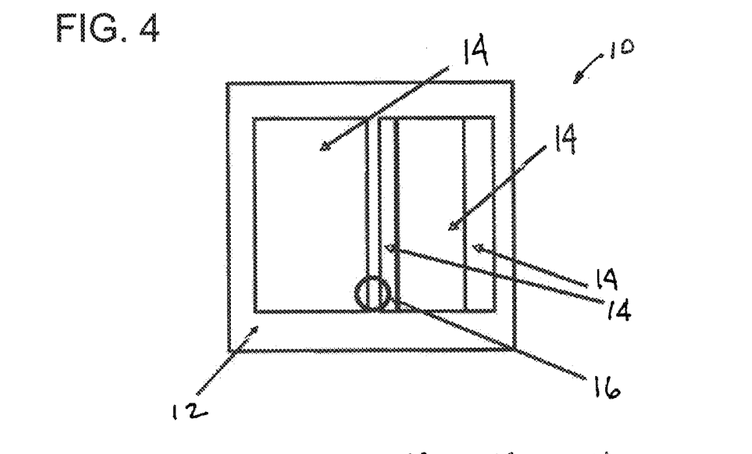
FIGS. 4-7 show exemplary configurations of the switch.
Figure 5:
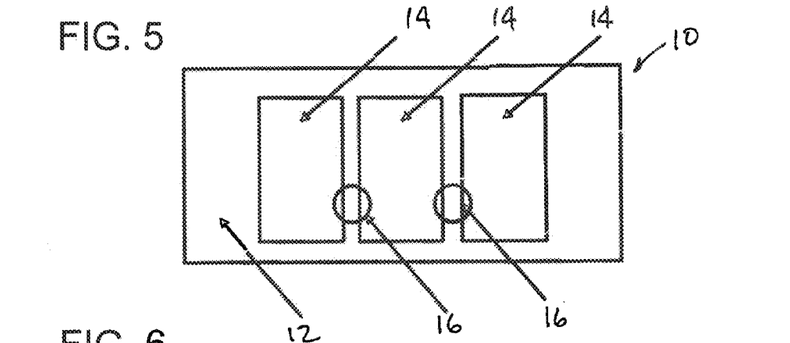
Figure 6:
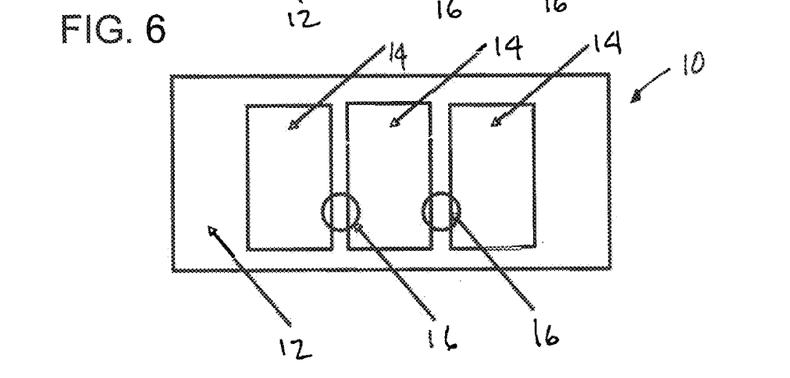
Figure 7:
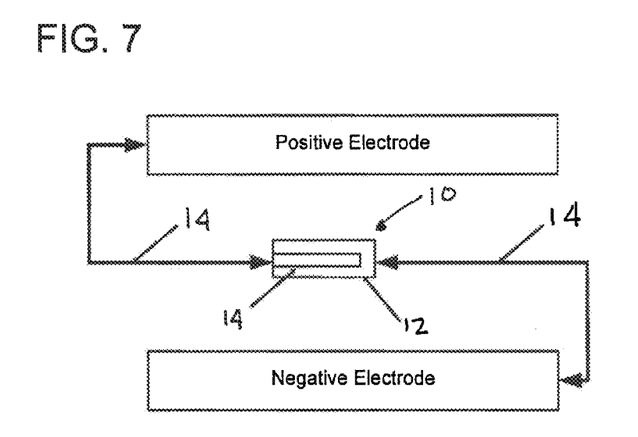

FIG. 3 shows how current is shunted through the switch 10 from the cathode to the anode (both sides shown by reference 24, as either side can be the cathode or the anode) by the current path indicated by arrows 22. The electrically conductive material 14 and the battery are brought up to the melting point of the conductive material 14. Once the melting point is achieved, the two sides of the switch 10 flow together making contact between the cathode and anode of the battery. Thus, allowing current to flow within the battery and mimicking an internal short. In one embodiment, the electrically conductive material 14 is an indium alloy. But any material may be used having the desired melting point (e.g., 310 below 150° C.) and is electrically conductive.

It should be noted that the switch can come in a number of different configurations. FIGS. 4-7 show exemplary configurations of the switch. In any configuration, a material melts and causes the positive and negative electrodes of an energy storage device to be electrically connected. The electrically conductive material in the switch can be a combination of materials that have high and low melting points.

Figure 8:
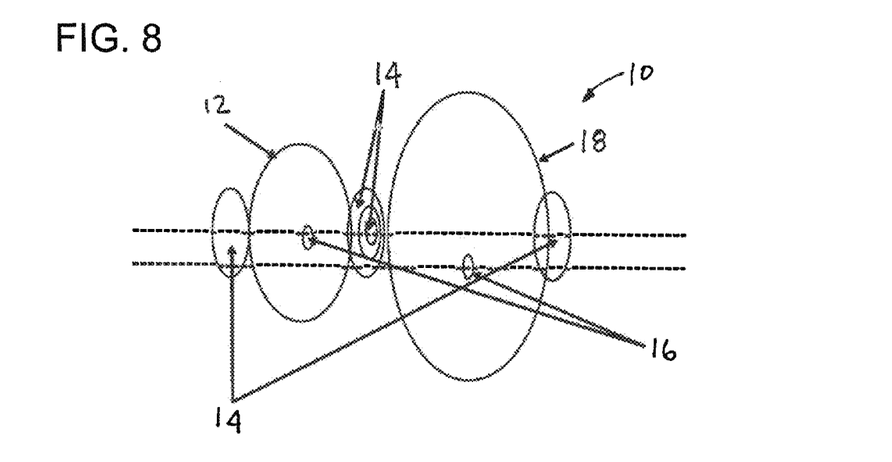
FIG. 8 shows another exemplary design when using an electrically conductive material with a low melting point.
Figure 9A:
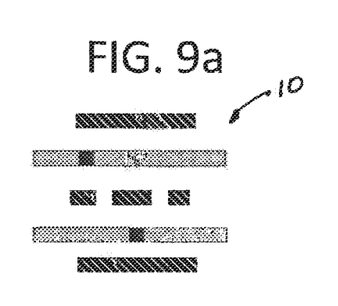
FIGS. 9a-d and FIGS. 10a-e are illustrative of several exemplary configurations.
Figure 9B:
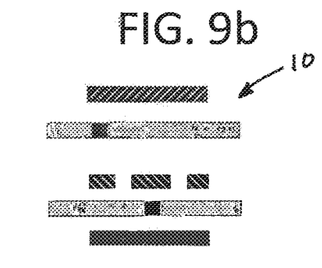
Figure 9C:
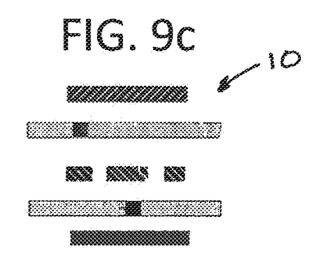
Figure 9D:
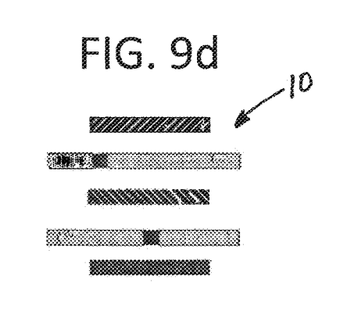
Figure 10A:
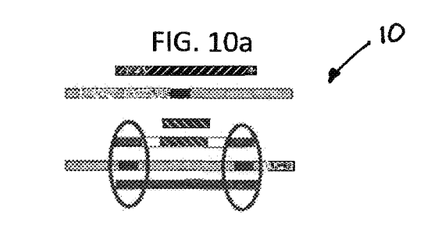
Figure 10B:
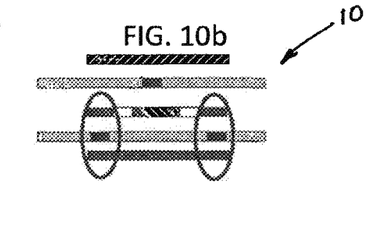
Figure 10C:
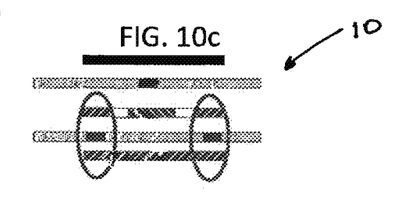
Figure 10D:
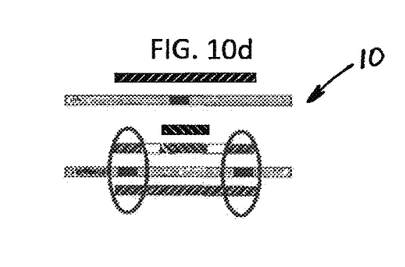
Figure 10E:
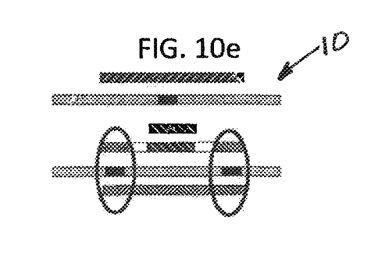
Figure 11A:
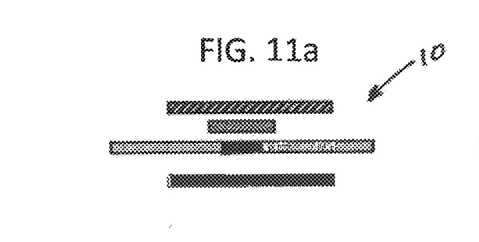
FIGS. 11a-e illustrate a phase change material (PCM) design for internally shorting an energy storage device, and exemplary embodiments.
Figure 11B:
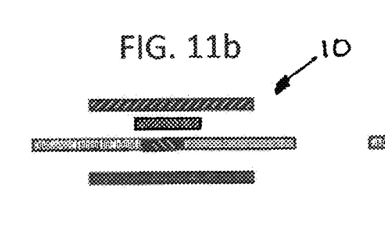
Figure 11C:
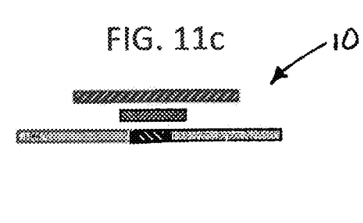
Figure 11D:
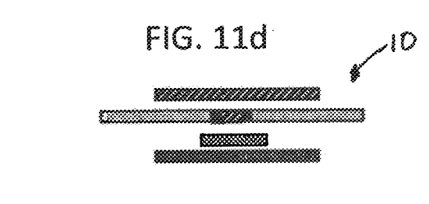
Figure 11E:
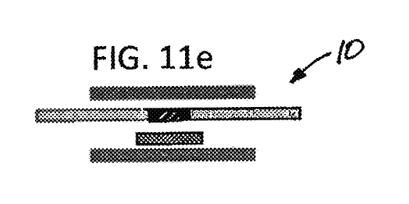

FIG. 8 shows another exemplary design of the switch 10 when using an electrically conductive material 14 with a low melting point. This design helps ensure that when the electrically conductive material 14 melts, no matter the direction of the flow of material 14, a short will be created between the two sides of the battery.

It should be noted that the switch can be applied or used in any of a wide variety of different configurations. FIGS. 9a-d and FIGS. 10a-e are illustrative of several exemplary configurations of the switch 10. In each case, at least one material 14 combines (e.g., by melting) and causes the positive and negative electrodes of the energy storage device to be electrically connected. In one embodiment, the electrically conductive material can be a combination of materials, e.g., having different melting points.

A phase change material (PCM) or wax design for the switch 10 is also contemplated for internally shorting an energy storage device, and exemplary embodiments are illustrated in FIGS. 11a-e. The PCM or wax is used as an insulator preventing the cathode and anode from making contact during normal operation of the battery. Once the battery is brought up in temperature to the melting point of the PCM or wax, the wax, having a very low viscosity, is wicked away by the battery separator and a short is created between the cathode and anode of the energy storage device. This design offers compact configuration for the switch 10, obviates conducting current through a low melting point alloy, and has demonstrated consistent repeatability in shorting coin cells.

Figure 12:
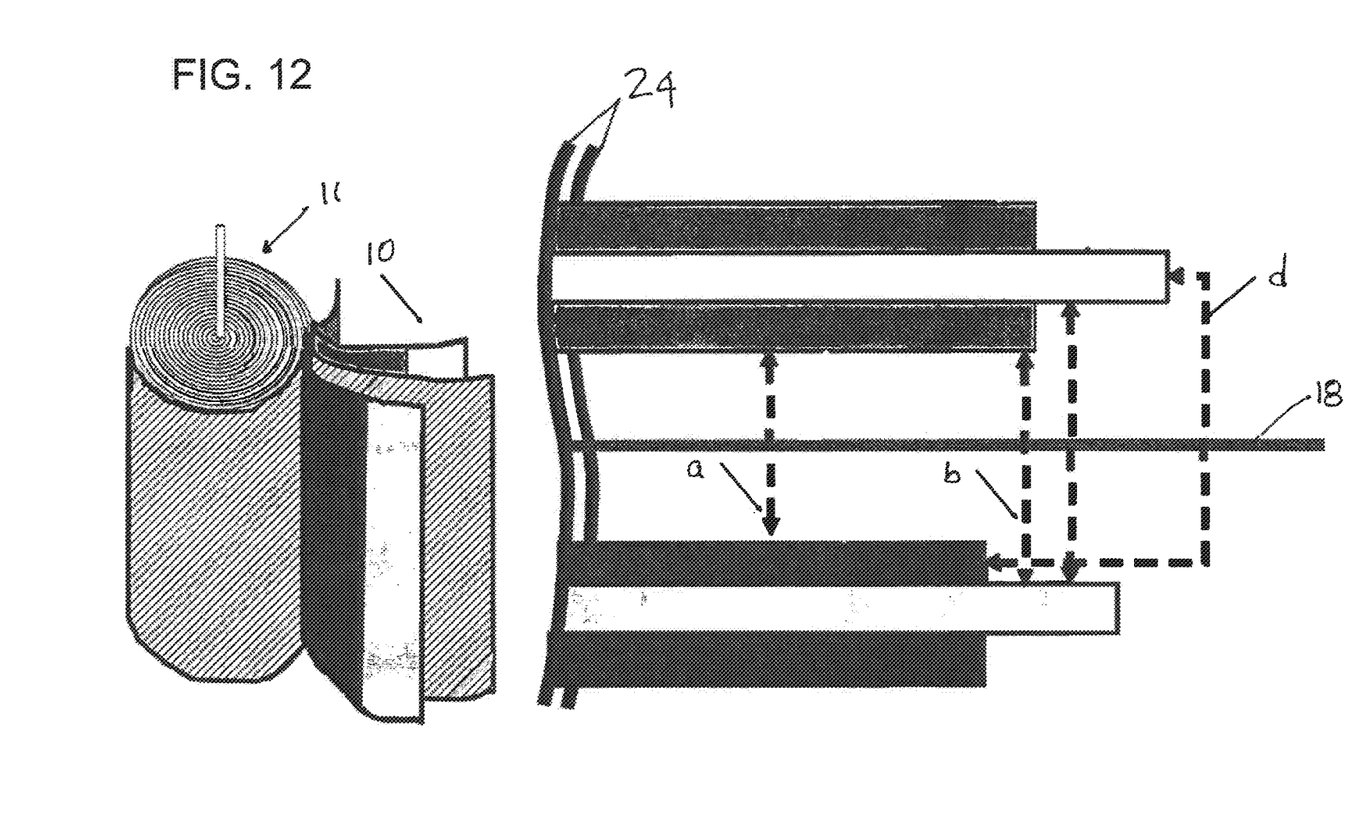
FIG. 12 illustrates exemplary placement of the switch.

FIG. 12 illustrates exemplary placement of the switch 10 in a battery 11, wherein the switch 10 is shown a) between the cathode and anode active material coatings, b) between the cathode and the current collector of the negative electrode, c) between the anode and the current collector of the positive electrode, and d) between the positive and negative electrode current collectors. It is noted that these configurations are shown for purposes of illustration only, and are not intended to be limiting. Configuring the switch on different areas of the separator enables different shorting mechanisms and conditions.

In one exemplary use case, the internal short may be used as a passive safety device within the cell to prevent the cell from going into thermal runaway. In advanced vehicles, for example, the batteries are typically prevented from going into thermal runaway by the battery management system (BMS). A BMS is any electronic device that manages a rechargeable battery by monitoring state, calculating data, reporting data, and so forth. However, the BMS itself may fail. Also, the BMS may not monitor the temperature of every battery in the battery pack, and an unmonitored battery may increase in temperature without the BMS detecting and issuing a warning signal to the vehicle engineering control unit (ECU) which monitors electronic and mechanical systems for the vehicle. In addition the latent defects due to manufacturing or other mechanisms may cause a failure leading to events wherein a BMS or cooling system may be overwhelmed. Accordingly, a battery can heat up, for example, due to one or more of the following reasons (or other reasons not set forth herein):

1) Failure of the battery management system;
2) Temperature is not being monitored on a cell or on the proper location on a cell;
3) Overvoltage of the cell;
4) Poor thermal management design;
5) Internal short within the cell; and
6) Failure of the separator, as clarified below.

The separator in battery systems allows ionic conduction between the cathode and anode, but electrically isolates the cathode and anode from each other, in some battery systems, the separator shrinks as it heats up. If for example, the temperature of a battery increases due to an over-voltage situation, the separator keeps the cathode and anode apart until the separator reaches approximately 120° C. to 150° C. After the separator begins to shrink, however, the cathode and anode are no longer isolated from each other and a violent exothermic chemical reaction may ensue.

Therefore, according to one embodiment of a passive safety device, the melting point of the switch can be selected so that the cell shorts in a controlled manner through a predetermined resistance. In one embodiment, the switch comprises an electrically conductive material that has a low melting point and a thin/thick film resistor that is attached to the non-conductive patch by the use of a solder (low or high temperature solders can be used). One side of the switch is connected to the anode and the other side of the switch is connected to the cathode. The melting point of the low melting point or phase change material is selected so that the switch is activated before the separator shrinks, but high enough to prevent nuisance activations from normal operations. Once the low-melting, point material or PCM melts, it connects the anode or negative side of the cell to the cathode or positive side of the cell through the resistor. The impedance/resistance of the resistor can be selected such that a known current travels through the resistor.

The safety device may be located near the wall of the battery such that the heat developed during discharge can be dissipated to ambient air or other cooling devices. The energy in the battery may be dissipated through the switch, thereby pre venting the separator from failing, and preventing or reducing the occurrence of a violent reaction. In another embodiment, the switch is placed inside the cell while an appropriately sized resistor is located outside for dissipating the energy from the battery.

It has been found that the contact resistance between the metal pads (typically the metal pads are aluminum and/or copper) in the internal short and the cathode and anode affects the correct operation of the short. In particular, the contact resistance between the aluminum pad and the cathode is very high. If the internal short is to act as a hard short, the contact resistance between the metal pads and their respective electrode materials should be decreased. The contact resistance can be decreased by placing a silver paste, copper paste, aluminum paste, or some other electrically conductive paste, between the metal pad and the electrode material. However, the thickness and the potential of the paste to flow during compression of the cell and cause an unexpected short, is undesirable in some embodiments. Therefore, if a paste is to be used, it should be judiciously applied.

An alternative is to coat the metal pad with a ductile material that does not form an oxide layer. Two candidate materials include but are not limited to platinum and gold. The cost of these materials is immaterial compared to those for the fabrication of the short since the material is sputtered or a CVD process is used to limit the thickness of the material (typically, the thickness of the material is less than about 50 microns). The contact resistance can be reduced considerably with a thickness of less than 10 microns. Ductile and electrical conductive metals may include pure indium, with a melting point of around 160 degrees Celsius. Indium is relatively low in cost and in laboratory tests has reduced the contact resistance considerably. A reduction in the contact resistance may also be achieved by coating the interface of the device with carbon particles, carbon fibers, graphite, or a combination thereof. Alternatively, the aluminum pad in the device may be coated onto the cathode slurry surface during electrode assembly to achieve the minimum contact resistance. Thereafter, the internal short device may be built on that pad during cell assembly.

Another method of reducing the contact resistance is to place a low melting point electrically conductive alloy such as an indium alloy between the metal pad and the electrode material. As an example, the microcrystalline wax melts at about 58 degrees Celsius. An indium alloy that melts at 54 degrees Celsius may be placed between the metal pads and electrode material. The indium melts first and reduces or altogether eliminates the contact resistance between the metal pad and the electrode material, thereby creating a robust electrical connection. Once the melting point of the wax is reached, a highly electrically conductive path is provided for the current to flow.

The trigger temperature for the passive safety device is set by selecting a trigger material (metal, wax, or other material) with an appropriate melting point. The trigger temperature should be sufficiently above the normal operating temperature range of the cell to prevent a possible false-trigger and unintended discharge. At the same time, the trigger temperature should be sufficiently below any temperature that: (1) initiates chemical decomposition reactions within the battery, or (2) melts any critical component within the cell such as the separator. For lithium-ion cells, the trigger temperature may be in the range of about 50° C. to 110° C.

The external load is thermally and electrically tuned for optimal discharge of the cell within the following tradeoffs. With respect to electrical tuning, the load is sized to discharge the cell in as short a period of time as possible, but without causing excessive temperature rise inside the cell due to electrochemical discharge processes. With respect to thermal tuning, the load is placed outside of the cell electrochemical active area and has a good heat dissipation path to a large thermal reservoir. This reservoir can be ambient, surrounding system components or packaging, or even neighboring cells so long as those neighboring cells are not excessively heated by the dissipative load.

Figure 13:
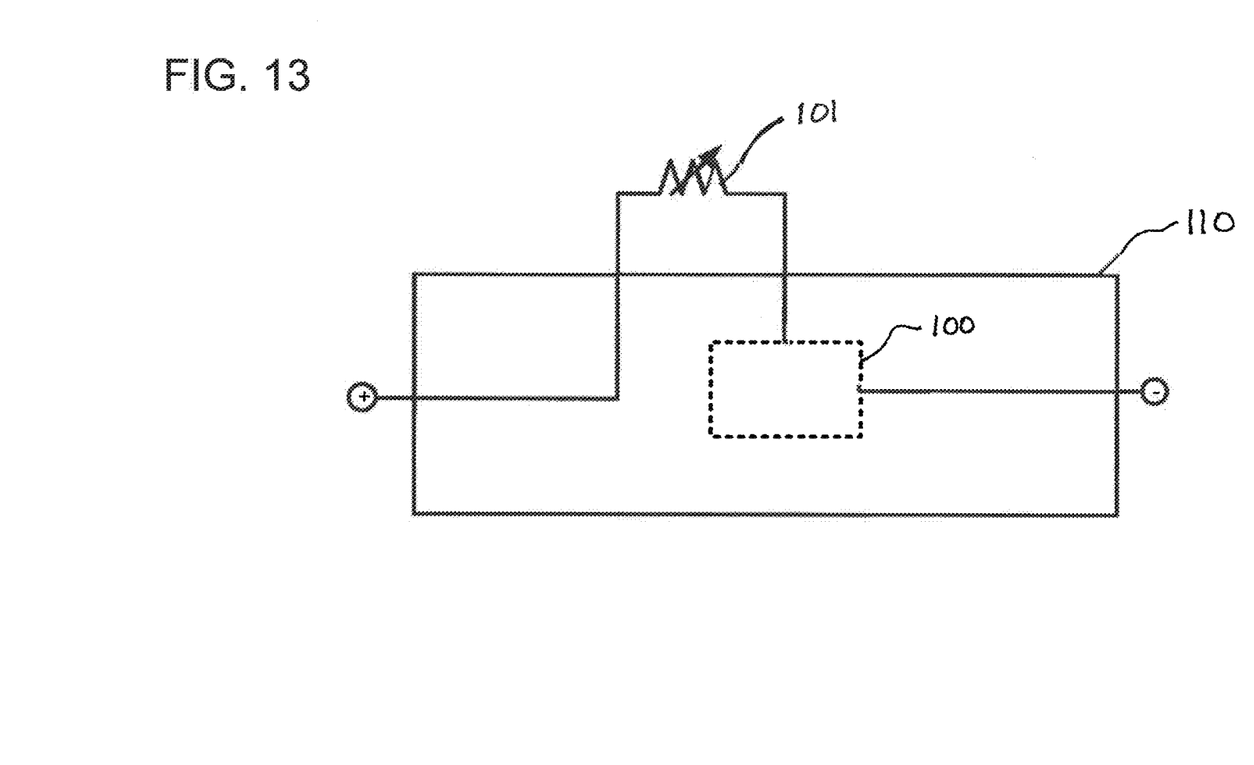
FIG. 13 is a schematic diagram showing an alternative embodiment of a switch.

In addition to simulating an internal short condition for test purposes, the thermal switch may be applied to consumer-ready cells to discharge the cell to a safe state in the case that an unsafe high temperature ever occurs during its life. Rather than route the short current though the inside of the cell, the thermal switch instead routes the short current through a load or resistor located outside the cell. FIG. 13 is a schematic diagram showing an alternative embodiment of a switch 100. By locating the load 101 outside the cell 110, stored energy can be removed from the cell 110 bringing it to a safe state. Dissipating the stored energy in a controlled manner may help prevent or lessen the severity of a possible thermal event.

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope.

The invention claimed is:

1. A passive safety device for an energy storage cell for positioning between two electrically conductive layers of the energy storage cell, the device comprising:
   a separator;
   a non-conductive layer;
   a first electrically conductive material provided on the non-conductive layer;
   a first opening formed through the separator between the first electrically conductive material and one of the electrically conductive layers of the energy storage cell;
   a second electrically conductive material provided adjacent the first electrically conductive material on the non-conductive layer, wherein a space is formed on the non-conductive layer between the first and second electrically conductive materials;
   a second opening formed through the non-conductive layer between the second electrically conductive material and another of the electrically conductive layers of the energy storage cell; and
   wherein the first and second electrically conductive materials combine and exit at least partially through the first and second openings to connect the two electrically conductive layers of the energy storage cell at a predetermined temperature.

2. The device of claim 1, wherein the separator is made of a material substantially similar to a material already used for packaging the energy storage cell.

3. The device of claim 1, wherein the separator has a length and width in the range of about 0.0050 to 5 inches.

4. The device of claim 1, wherein the first and second electrically conductive materials are deposited on the non-conductive layer by at least one of the following processes: chemical vapor deposition, plasma enhanced chemical vapor deposition, physical vapor deposition, thermal evaporator, electron beam evaporator, sputtering, and plating.

5. The device of claim 1, wherein the separator has a melting point in the range of about 10 to 150° C.

6. The device of claim 1, wherein the first and second electrically conductive materials have different melting temperatures.

7. The device of claim 1, wherein the first and second electrically conductive materials have a thickness of less than about 500 microns.

8. The device of claim 1, wherein the first and second electrically conductive materials are positioned in at least one of the following configurations: between a cathode and an anode active material coatings, between a cathode and a current collector of a negative electrode, between an anode and a current collector of a positive electrode, and between positive and negative current collectors.

9. The device of claim 1, wherein the space is in the range of about 0.0005 to 0.25 inches.

10. A method of generating an electrical short between two electrically conductive layers of the energy storage cell, the method comprising:

providing a first electrically conductive material on a non-conductive layer;
forming a first opening through a separator between the first electrically conductive material and one of the electrically conductive layers of the energy storage cell;
providing a second electrically conductive material adjacent the first electrically conductive material on the non-conductive layer, wherein a space is formed on the non-conductive layer between the first and second electrically conductive materials;
forming a second opening through the non-conductive layer between the second electrically conductive material and another of the electrically conductive layers of the energy storage cell; and
combining the first and second electrically conductive materials to exit at least partially through the first and second openings to connect the two electrically conductive layers of the energy storage cell at a predetermined temperature.

11. The method of claim 10, further comprising providing the separator from a material substantially similar to a material already used for packaging the energy storage cell.

12. The method of claim 10, wherein the separator has a length and width in the range of about 0.0050 to 5 inches.

13. The method of claim 10, further comprising depositing the first and second electrically conductive materials on the non-conductive layer by at least one of the following processes: chemical vapor deposition, plasma enhanced chemical vapor deposition, physical vapor deposition, thermal evaporator, electron beam evaporator, sputtering, and plating.

14. The method of claim 10, wherein the first and second electrically conductive materials combines in a temperature range of about 10 to 150° C.

15. The method of claim 10, wherein the first and second electrically conductive materials have different combination temperatures.

16. The method of claim 10, wherein the first and second electrically conductive materials have a thickness of less than about 500 microns.

17. The method of claim 10, wherein the space is in the range of about 0.0005 to 0.25 inches.

* * * * *